United States Patent
Löffler et al.

(10) Patent No.: US 6,436,004 B1
(45) Date of Patent: Aug. 20, 2002

(54) PULLEY SLIP CONTROL FOR CONTINUOUS VARIABLE TRANSMISSIONS

(75) Inventors: Bernd Löffler; Hans-Dieter Hengstler, both of Ravensburg; Joachim Cichy, Kressbronn, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 21 days.

(21) Appl. No.: 09/630,935

(22) Filed: Aug. 2, 2000

(30) Foreign Application Priority Data

Aug. 7, 1999 (DE) .......................... 199 37 472

(51) Int. Cl.⁷ ............................................. B60K 41/12
(52) U.S. Cl. ............................................ 477/45
(58) Field of Search .......................... 477/44, 45, 46

(56) References Cited

U.S. PATENT DOCUMENTS

| | | | |
|---|---|---|---|
| 4,759,236 A | * | 7/1988 | Tezuka et al. ............ 477/45 X |
| 5,011,458 A | * | 4/1991 | Kumm ..................... 74/640 X |
| 5,042,325 A | * | 8/1991 | Sawasaki et al. ............. 477/45 |
| 5,259,272 A | * | 11/1993 | Yamamoto et al. ........... 477/45 |
| 5,707,314 A | * | 1/1998 | Kashiwabara et al. ........ 477/45 |
| 5,720,692 A | * | 2/1998 | Kashiwabara ................ 477/45 |
| 6,050,917 A | * | 4/2000 | Gierling et al. .............. 477/45 |
| 6,146,294 A | * | 11/2000 | Bolz .............................. 474/8 |
| 6,168,546 B1 | * | 1/2001 | Loffler ..................... 477/45 X |

FOREIGN PATENT DOCUMENTS

| | | | |
|---|---|---|---|
| DE | 44 11 628 A2 | 10/1995 | |
| DE | 195 05 561 A1 | 8/1996 | |
| JP | 404064760 | * 2/1992 | ................. 477/44 |

* cited by examiner

Primary Examiner—Charles A. Marmor
Assistant Examiner—Roger Pang
(74) Attorney, Agent, or Firm—Davis & Bujold, P.L.L.C.

(57) ABSTRACT

Within the scope of the process for variator slip treatment in continuously variable automatic transmissions of a motor vehicle, upon detection of variator slip, a characteristic field (1) of slip meter is locally incremented according to ratio value (iv) and to engine torque (M_mot) and simultaneously an evaluated slip meter (2) of an evaluation module (3), likewise according to ratio value (iv) and to engine torque (M_mot), is increased, wherein via the evaluation module (3), the variator slip is assessed according to duration and intensity. Besides, a characteristic field (4) of slip status meter connected with the evaluated slip meter (2) is incremented together with the evaluated slip meter (2), a signal being passed on to an error memory (5) so that, with the entry of the error, slip, evaluated slip and slip status meter are entered in the error memory (5) as environmental conditions. Thereafter the contact pressure security is locally varied according to the characteristic field (4) of the slip status meter.

3 Claims, 1 Drawing Sheet

PULLEY SLIP CONTROL FOR CONTINUOUS VARIABLE TRANSMISSIONS

The invention concerns a process for variator slip control in continuously variable automatic transmissions.

BACKGROUND OF THE INVENTION

A continuously variable automatic transmission (CVT) usually consists, among others, of a starting unit, a forward/reverse drive unit, an intermediate shaft, a differential, hydraulic and electronic control devices and one variator. A customary variator construction is a belt-drive variator, having a primary and a secondary pulley, wherein both pulleys are formed by beveled pulleys disposed in pairs and, wherein the variator is provided with a torque transmitting belt-drive variator, having a primary and a secondary pulley, wherein both pulleys are formed by beveled pulleys disposed in pairs and, wherein the variator is provided with a torque transmitting belt-drive element which rotates between the two beveled pulley pairs. In such a transmission, the actual ratio is defined by the running radius of the belt-drive element which, in turn, is function of the axial position of the beveled pulleys. A CVT is consequently a positive-engagement transmission; the engine torque is transmitted by (static) friction between the belt-drive element and the variator pulleys.

In the prior art, the variator is mostly functionally divided in one side for control of the change of ratio (adjustment) and, in other side, for adjustment of the necessary contact pressures (tightening) which ensure the required contact between the pulley and the belt-drive element so that no slip generates. Depending on the operating point, either the primary or the secondary pulley is used for setting the contact pressures.

For this purpose, the transmission control adjusts on the variator a hydraulic contact pressure in order to make the momentary transmission of the engine torque possible. The main input variables for the pressure are the momentary transmission input torque and the transmission ratio. The contact pressure must be as high as needed and as low as possible; if the pressure is too low, the slipping of the variator (slip) results and therewith a damage to the transmission. If the pressure is too high, the efficiency of the transmission is unnecessarily impaired.

The contact pressure requirement is affected by many parameters not predictable at the time such as oil aging, smoothing of the pulley surface or kind of oil.

To prevent slippage between the pulley and the belt-drive element, the teaching of the prior art is to impose increased security or security factors on the calculated control pressure values. This procedure has the disadvantage that thereby the efficiency of the automatic transmission is impaired. Therefore, the increased security (security factor) must be selected as small as possible.

SUMMARY OF THE INVENTION

Accordingly, the problem on which this invention is based is to outline, departing from the cited prior art, a process for variator slip treatment and for protection of the variator for a CVT so as to obtain the best possible efficiency of the transmission and, at the same time, improve the prevention of damages to the transmission.

The inventive process must adapt the contact pressure to the operating point position so that it becomes possible to reduce the effects of an overpressure to a minimum which affects the efficiency.

According to the invention, this problem is solved with the features of claim 1. Other embodiments of the invention result form the sub-claims.

Accordingly, when the variator slip is detected, it is proposed locally to increment in the place where the slip occurs a slip meter characteristic field depending on the ratio value iv of the variator and on the engine torque M_mot f (iv, M_mot) and at the same time increase, via an evaluation module, an evaluated slip meter, the variator slip being assessed by means of the evaluation module according to duration and intensity.

It is further proposed to add to the evaluated meter a characteristic field of slip-status meter which is incremented with the evaluated slip meter.

Parallel to incrementing the meters, a belt slip error is entered in a diagnosis or error memory so that with the entry of the error, slip, evaluated slip and slip-status meter are entered as environmental conditions in the diagnosis or error memory.

According to the invention, unlike the belt-slip meter, the status meter can be locally decremented via a "self-healing function" when the transmission behavior is perfect with regard to the variator slip.

The status meter serves as factor for locally lifting the contact pressure security f(iv, M_mot) whereby in case of unnecessary slip detection or self-healing processes in the transmission mechanics (e.g. smoothing of the pulleys in the belt-drive variator), the contact pressure security can be again withdrawn which results in improvement of the efficiency.

The whole contact pressure security also results from other security factors to be taken into account. If the total contact pressure security exceeds a specific level (e.g. system limit or breaking limit), then a second error information is entered in the diagnosis memory (error memory), which information can be reacted to with other substitute function (e.g. hydraulic emergency running).

By deletion of the diagnosis or error memory, the error entries can be deleted but not belt slip meter and status meter. These are independent of the error memory and can be separately deleted. A resetting of the whole function by deleting the transmission diagnosis is thereby eliminated.

The switch for resetting slip and slip status meter must be provided with greater securities (qualifications) than the deletion of the diagnosis memory.

BRIEF DESCRIPTION OF THE DRAWINGS

The invention is explained, in detail herebelow, with reference to the enclosed FIGURE which shows a block circuit diagram illustration of the inventive process. In the embodiment shown, the variator is designed as belt-drive variator, wherefore the variator slip examined is a belt slip.

DESCRIPTION OF THE PREFERRED EMBODIMENTS

Figure 1:
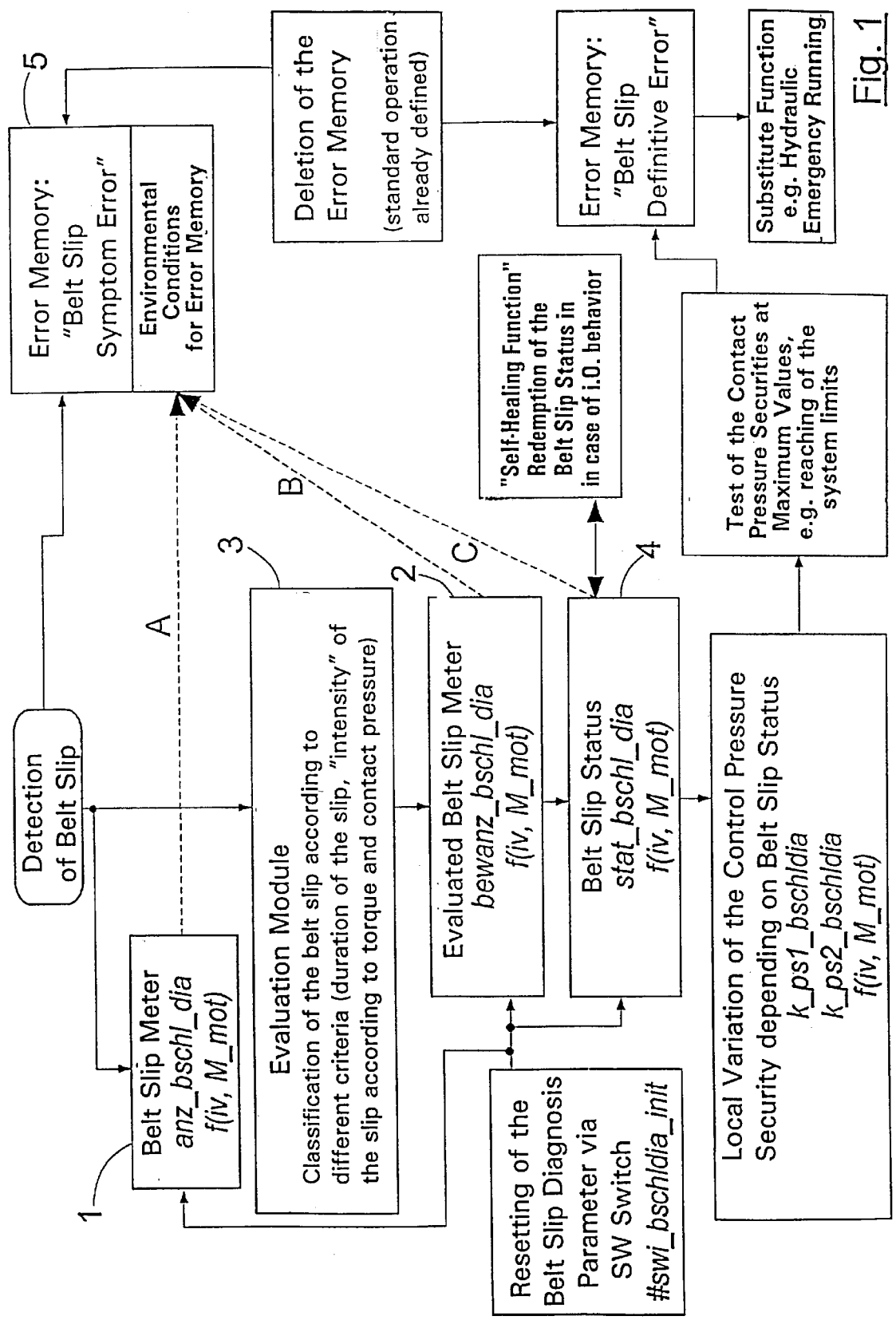

As is to be understood from the FIGURE, upon detection of belt slip, a characteristic field 1 of belt slip meter is locally incremented in accordance with the ratio value iv and with the engine torque M_mot and simultaneously an evaluated belt slip meter 2 of an evaluation module 3 is increased likewise in accordance with the ratio value iv and with the engine torque M_mot, the belt slip being assessed by means of the evaluation module 3 according to duration and intensity. With the evaluated belt slip meter 2 is connected a characteristic field 4 of belt slip status meter so as to be incremented together with the evaluated belt slip meter 2.

According to the invention, upon detection of belt slip, a signal is transmitted to a diagnosis or error memory 5 in order to indicate a symptom error of belt slip; the entry takes place in a manner such that, with the entry of the error, belt slip, evaluated belt slip and belt slip status meter are entered in the diagnosis memory as environmental conditions. This is made clear in the FIGURE by the arrows A, B and C as logical module linkages.

According to the invention, depending on the characteristic field 4 of belt slip status memory, the contact pressure security, which is function of variator ratio and engine torque M_mot, is locally varied. Thereby, It is ensured that, in case of an unnecessary belt slip detection or self-healing process in the transmission mechanics (smoothing of the pulleys), the contact pressure security is again withdrawn.

Within the scope of a preferred embodiment, the characteristic field 4 of belt status meter is locally decremented when the transmission behavior is perfect.

Thereafter is tested whether the whole contact pressure security exceeds a specific level (e.g. system limit or breaking limit). When this case occurs, a second error information is entered in the error memory 5 to which it is reacted with one other substitute function (e.g. hydraulic emergency running) in order to protect the system.

What is claimed is:

1. A process for treatment of variator slip in a continuously variable automatic transmission, the process comprising the steps of, upon detection of variator slip, increasing a characteristic field (1) of a slip meter according to a ratio value (iv) of a variator and to an engine torque (M_mot) of a prime mover and simultaneously an evaluated slip meter (2) of an evaluation module (3), likewise according to the ratio value (iv) of the variator and to the engine torque (M_mot), is increased, assessing the variator slip according to a duration and an intensity by the evaluation module (3), and increasing a characteristic field (4) of a slip status meter connected with said evaluated slip meter (2) together with said evaluated slip meter (2), passing a signal to an error memory (5) in such a manner that, with the entry of an error, the slip, an evaluated slip and a slip-status meter are entered in said error memory (5) as environmental conditions and, depending on the characteristic field (4) of the slip-status meter, a contact pressure security of said variator is locally varied as a function of the variator ratio (iv) and the engine torque (M_mot), and deleting the error entry by deletion of the error memory (5), and said characteristic field (4) of said slip status meter being deleted independently and separately of said error memory.

2. The process according to claim 1, further comprising the step of locally decreasing the characteristic field (4) of the slip-status meter once a desired behavior of the transmission is achieved.

3. The process according to claim 1, further comprising the step of testing whether a whole contact pressure security of the variator exceeds a specific level and, if the contact pressure security of the variator exceeds the specific level, entering a second error information in said error memory (5) and allowing a system to react with a substitute function in order to protect the system.

* * * * *